(12) United States Patent
Mitsumoto et al.

(10) Patent No.: US 6,611,225 B2
(45) Date of Patent: Aug. 26, 2003

(54) RADAR SIGNAL PROCESSING APPARATUS, AND METHOD OF MEASURING DISTANCE AND SPEED

(75) Inventors: Masashi Mitsumoto, Tokyo (JP); Takahiko Fujisaka, Tokyo (JP); Koichi Kai, Tokyo (JP)

(73) Assignee: Mitsubish Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/137,280

(22) Filed: May 3, 2002

(65) Prior Publication Data

US 2002/0190894 A1 Dec. 19, 2002

(30) Foreign Application Priority Data

May 11, 2001 (JP) .......................................... 2001-141655

(51) Int. Cl.$^7$ .............................................. G01S 13/93
(52) U.S. Cl. ......................... 342/70; 342/109; 342/111; 342/192; 342/196
(58) Field of Search ............................... 342/70–72, 87, 342/99, 102, 109, 111, 115, 127, 130, 134, 135, 195–196, 200–202

(56) References Cited

U.S. PATENT DOCUMENTS

| 5,905,458 | A | * | 5/1999 | Ashihara | 342/70 |
| 6,018,309 | A | | 1/2000 | Mitsumoto et al. | |
| 6,137,435 | A | * | 10/2000 | Kai | 342/70 |
| 6,292,129 | B1 | * | 9/2001 | Matsugatani et al. | 342/70 |
| 6,335,701 | B1 | * | 1/2002 | Fujisaka et al. | 342/115 |
| 6,369,748 | B1 | * | 4/2002 | Uehara | 342/70 |

FOREIGN PATENT DOCUMENTS

| JP | 11-237471 | 8/1999 |
| JP | 2000-275333 | 10/2000 |

* cited by examiner

*Primary Examiner*—Thomas H. Tarcza
*Assistant Examiner*—Isam Alsomiri
(74) *Attorney, Agent, or Firm*—Birch, Stewart, Kolasch & Birch, LLP

(57) ABSTRACT

A radar signal processing apparatus has a range gate for extracting range gate data sequences from a memory, a first frequency extraction section which extracts a beat frequency corresponding to a target by performing frequency analysis by FFT at a low computation load and with low frequency measurement accuracy on all range gate data sequences extracted by the range gate, a second frequency extraction section which extracts a beat frequency corresponding to the target by performing frequency analysis by FFT at a high computation load and with high frequency measurement accuracy only on the range gate data sequence from which a beat frequency has been extracted by the first frequency extraction section, and a distance and speed derivation section which obtains the relative distance and the relative speed of the target on the basis of the beat frequency extracted by the second frequency extraction section.

10 Claims, 15 Drawing Sheets

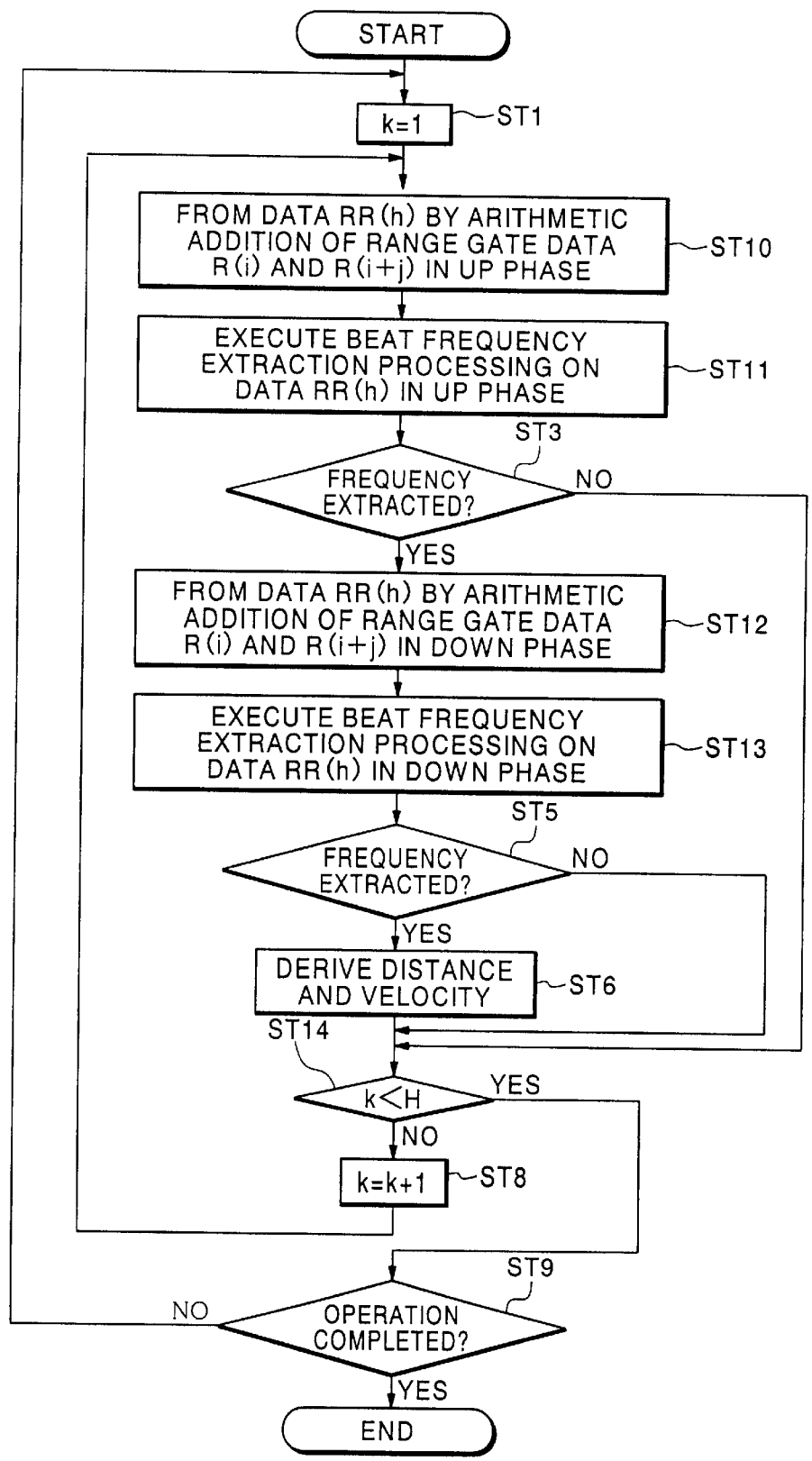

RADAR SIGNAL PROCESSING APPARATUS, AND METHOD OF MEASURING DISTANCE AND SPEED

This application is based on Application No. 2001-141655, filed in Japan on May 11, 2001, the contents of which are hereby incorporated by reference.

BACKGROUND OF THE INVENTION

1. Field of the Invention

The present invention relates to a radar apparatus mounted on a moving body such as a vehicle, and more particularly, to a radar signal processing apparatus capable of detecting an object as a target of measurement with a radar to measure a relative distance and a relative speed between the target and the radar (hereinafter referred to as "relative distance" or "the distance" and "relative speed" or "the speed", respectively). Further the present invention relates to a method of measuring the distance and the speed with the radar signal processing apparatus.

2. Description of the Related Art

Radar apparatuses mounted on vehicles or the like only covers a range of about several to several hundreds of meters in which the radar apparatuses can measure the distances to the targets. It is desirable for the radar apparatuses with such a range to have a transmitting antenna and a receiving antenna combined into one in terms of reduction in size if mounted on the vehicles or the like. As a conventional radar apparatus designed to meet such a requirement, a frequency modulated interrupted continuous wave (FMICW) radar apparatus is known.

The conventional radar apparatus will be described with reference to drawings.

FIG. 10 is a block diagram showing the basic structure of a transmitter/receiver 1 of an FMICW radar apparatus.

Referring to FIG. 10, the radar transmitter/receiver 1 has a transmission/reception control section 2, a modulated waveform generation section 3, a voltage controlled oscillator (VCO) 4, a first switch 5, a second switch 6, an antenna 7, distribution circuits 9a and 9b, a phase shift circuit 10, and mixers 11a and 11b. A target to be detected by the radar apparatus is indicated by 8 in FIG. 10.

FIG. 11 is a diagram showing the structure of a radar signal processing apparatus 12 to which a received signal and a control signal of FIG. 10 are input.

Referring to FIG. 11, the radar signal processing apparatus 12 has a signal processing control section 13, a third switch 14, analog to digital converters (ADCs) 15a and 15b, memories 16a and 16b, range gates 17a and 17b, frequency extraction sections 18a and 18b, and a distance and speed derivation section 19.

The operation of the conventional radar apparatus will be described with reference to drawings.

FIG. 12 is a diagram showing the frequencies of signals with respect to time in the FMICW radar apparatus. In the following description, a state of modulation in a period where the frequency increases with time is referred to as "up phase" and a state of modulation in a period where the frequency decreases with time is referred to as "down phase".

FIG. 12 shows an up-phase VCO signal 20a, a down-phase VCO signal 20b, an up-phase signal 21a to be transmitted, a down-phase signal 21b to be transmitted, an up-phase local signal 22a, a down-phase local signal 22b, an up-phase received signal 23a, a down-phase received signal 23b, an up-phase beat signal 24a, and a down-phase beat signal 24b.

FIG. 13 is a diagram showing connection to a contact with respect to time in each of the first and second switches 5 and 6 shown in FIG. 10.

FIG. 14 is a diagram showing a data matrix formed in each of the memories 16a and 16b shown in FIG. 11 by sampling up-phase or down-phase beat signals.

FIG. 15 is a flowchart showing the procedure of signal processing in the radar signal processing apparatus shown in FIG. 11.

The operation of the FMICW radar apparatus will be described. The FMICW radar apparatus intermittently uses a frequency modulated continuous wave as its name implies.

Referring to FIG. 10, a modulated waveform which has up and down phases and which is generated by the modulated waveform generation section 3 is input to the VCO 4 through a control of the transmission/reception control section 2 in the radar transmitter/receiver 1, and a VCO signal 20 shown in FIG. 12 is formed from the input by the VCO 4 and is input to the first switch 5.

The first switch 5 and the second switch 6 are controlled by the transmission/reception control section 2 so as to repeat establishing synchronized connection through a contact t during a time period τ set in advance and connection through a contact r during another time period T−τ, as shown in FIG. 13.

During the up-phase period, the VCO signal 20a is fed through the contact t for the time period τ to produce a wave of a signal 21a to be transmitted. The signal 21a is supplied to the antenna 7 through the first switch 5 and the second switch 6 to radiate from the antenna 7 into air.

The transmitted signal 21a radiating into air is applied to the target 8 which is moving at a certain relative speed V while keeping a certain relative distance R, and part of the signal is reflected by the target 8. The reflected wave from the target 8 is shifted by a Doppler frequency Fv according to the relative speed V and is received as the received signal 23a shown in FIG. 12 by the antenna 7 with a delay of Kτ=2R/c (c: the speed of electric waves) from the time at which the signal 21a is transmitted. The received signal 23a is input to the distribution circuit 9a via the second switch 6 in which connection through the contact r is made for the time period T−τ. The distribution circuit 9a divides the input signal into two signals which are respectively input to the mixers 11a and 11b.

On the other hand, the VCO signal 20a fed through the first switch 5 in which connection through the contact r is made for the time period T−τ is input as the local signal 22a to the distribution circuit 9b. The distribution circuit 9b divides the input signal into two signals which are respectively input to the mixer 11a and the phase shift circuit 10.

The phase shift circuit 10 shifts the phase of the input signal by π/2 radian and outputs the phase shifted signal to the mixer 11b.

The received signal 23a and the local signal 22a respectively input to the mixers 11a and 11b are mixed in a period Kτ to (K+1)τ in the time period T−τ to form the beat signal 24a in which the frequency difference between the received signal 23a and the local signal 22 appears as a frequency.

At this time, the beat signal 24a is obtained as a complex signal from the mixers 11a and 11b, the beat signal 24a from the mixer 11a corresponding to the real part (I) of the complex signal, the beat signal 24a from the mixer 11b corresponding to the imaginary part (Q) of the complex signal.

During the down-phase period, the beat signal 24b is obtained in the same manner as during the up-phase period.

The beat signals 24a in the up-phase is represented by Sup(t) in an equation (1) shown below and the beat signal 24b in the down-phase is represented by Sdn(t) in an equation (2) shown below.

$$Sup(t)=Aup \cdot \exp(j2\pi U \cdot t + \phi up)=Aup \cdot \cos(2\pi U \cdot t + \phi up)+jAup \cdot \sin(2\pi U \cdot t + \phi up) \quad (1)$$

$$Sdn(t)=Adn \cdot \exp(j2\pi D \cdot t + \phi dn)=Adn \cdot \cos(2\pi D \cdot t + \phi dn)+jAdn \cdot \sin(2\pi D \cdot t + \phi dn) \quad (2)$$

$$U = -\frac{2B}{cT}R + \frac{2}{\lambda}V \quad (3)$$

$$D = \frac{2B}{cT}R + \frac{2}{\lambda}V \quad (4)$$

(Aup, Adn: amplitude terms; φup, φdn: phase terms; U: up-phase beat frequency; D: down-phase beat frequency; B: frequency sweep width; T: frequency sweep time; c: speed of light; λ: wavelength; R: relative distance to target; and V: relative speed of target)

Beat signals (I and Q) and a control signal (x) from the transmission/reception control section 2 are supplied from the radar transmitter/receiver 1 to the radar signal processing apparatus 12.

On the basis of the control signal from the transmission/reception control section 2, the signal processing control section 13 of the radar signal processing apparatus 12 makes connection through a contact U in the third switch 14 during the up-phase period and makes connection through a contact D in the third switch 14 during the down-phase period.

This switching enables the up-phase beat signal to be sampled by the ADC 15a during every period τ in the time period τ to T to be stored in the memory 16a, and also enables the down-phase beat signal to be sampled by the ADC 15b during every period τ in the time period τ to T to be stored in the memory 16b.

Of either beat signal, when stored, N samples {P(1), R(1)}, {P(1), R(2)}, {P(1), R(3)}, . . . {P(1), R(N)} from P(1) which is transmitted the signal 21a or 21b are stored in order by the signal processing control section 13, as shown in FIG. 14.

Similarly, samples from (P2), i.e., {P(2), R(1)}, {P(2), R(2)}, {P(2), R(3)}, . . . {P(2), R(N)}, are also stored, thus forming a data matrix with respect to each phase. In the matrix, the row R(k) (k=1 to N) includes the signal of the target at the relative distance in the range expressed by the following equation (5).

$$k\frac{c\tau}{2} < Rk \le (k+1)\frac{c\tau}{2} \quad (5)$$

On the basis of the control signal from the transmission/reception control section 2, the signal processing control section 13 determines the time at which sampling of the final transmitted signal P(M) is completed, and proceeds to perform the next signal processing. The operation of the radar apparatus will be described with respect to details of the next signal processing with reference to FIG. 15.

In the first step ST1 of the procedure shown in FIG. 15, the signal processing control section 13 sets a range gate number counter (internal variable) k provided in itself to k=1.

In step ST2, the signal processing control section 13 controls the range gate 17a so that connection through the k-th contact is made. The k-th range gate data sequence in an up phase {P(1), R(k)}, {P(2), R(k)}, . . . {P(M), R(k)} is extracted from the memory 16a through this connection in the range gate 17a and is input to the frequency extraction section 18a. The frequency extraction section 18a performs frequency analysis on this range gate data sequence, for example, by fast Fourier transform (FFT) and sends a beat frequency extraction result corresponding to the target to the signal processing control section 13.

In step ST3, the signal processing control section 13 receives the extraction result from the frequency extraction section 18a and makes a determination as to whether a beat frequency has been extracted. If a beat frequency has been extracted, the process advances to step ST4. If no beat frequency has been extracted, the process moves to step ST7.

In step ST4, the signal processing control section 13 controls the range gate 17b so that connection through the k-th contact is made, as in step ST2. The k-th range gate data sequence in a down phase {P(1), R(k)}, {P(2), R(k)}, . . . {P(M), R(k)} is extracted from the memory 16b through this connection in the range gate 17b and is input to the frequency extraction section 18b. The frequency extraction section 18b performs frequency analysis on this range gate data sequence, for example, by FFT and sends a beat frequency extraction result corresponding to the target to the signal processing control section 13.

In step ST5, the signal processing control section 13 receives the extraction result from the frequency extraction section 18b and makes a determination as to whether a beat frequency has been extracted. If a beat frequency has been extracted, the process advances to step ST6. If no beat frequency has been extracted, the process moves to step ST7.

In step ST6, the distance and speed derivation section 19 forms all combinations of extracted beat frequencies U1, U2, . . . AUp in the up phase and beat frequencies D1, D2, . . . ADq in the down phase, and searches for a pair of frequencies Cij (Ui, Dj) at which the relative distance R obtained by an equation (6) shown below is within the range Rk expressed by equation (5). If a pair of frequencies which meet the condition is found, the relative speed V of the target is obtained by using an equation (7) shown below.

$$R = \frac{cT}{4B}(D - U) \quad (6)$$

$$V = \frac{\lambda}{4}(U + D) \quad (7)$$

In step ST7, the signal processing control section 13 compares the value of the counter k with N. If k is not equal to N, the process advances to step ST8. If k is equal to N, the process moves to step ST9.

In step ST8, the signal processing control section 13 increments the value of the counter k. The process then moves to step ST2.

In step ST9, the signal processing control section 13 makes a decision on termination of the operation. If the decision is not to terminate the operation, the process returns to step ST1. If the decision is to terminate the operation, the operation is terminated. For example, the operation is terminated when an instruction from an operator is input to the signal processing control section 13.

In the conventional FMICW radar apparatus arranged as described above, frequency extraction from all the N distance bins must be performed with respect to each phase and it is not always possible to perform extraction processing in real time.

Japanese Patent Application Laid-open No. 2000-275333 discloses, as means for solving this problem, a method of adding a plurality of different range gate data sequences to reduce the number of range gate data groups to be processed.

FIG. 16 shows the structure of another conventional radar signal processing apparatus arranged to realize this solution.

The processor shown in FIG. 16 has an addition range gate setting section 25 and plural range gate addition sections 26a and 26b.

FIG. 17 is a flowchart showing the procedure of signal processing in this conventional radar signal processing apparatus.

The operation of the FMICW radar apparatus will be described. The operation is performed in the same manner as that of the above-described conventional FMICW radar apparatus with respect to the procedure up to the process of forming a data matrix by storing up-phase and down-phase beat signals in the memories 16a and 16b, respectively.

In the first step ST1 shown in FIG. 17, the signal processing control section 13 sets a range gate number counter k provided in itself to k=1.

In step ST10, the signal processing control section 13 notifies the addition range gate setting section 25 of the completion of sampling of the final transmitted signal P(M) and the addition range gate setting section 25 receiving this notice outputs to the plural range gate data addition section 26a range gate numbers designating data to be combined by arithmetic addition. For example, when the i-th range gate data and the (i+j)th range gate data are added together, the plural range gate data addition section 26a performs arithmetic addition of up-phase data as expressed by {P(1), R(i)}+{P(1), R(i+j)}, {P(2), R(i)}+{P(2), R(i+j)}, . . . , {P(m), R(i)}+{P(m), R(i+j)} and, from this result, newly forms a data sequence {P(1), RR(h)}, {P(2), RR(h)}, . . . , {P(m), RR(h)}.

In step ST11, the frequency extraction section 18a performs frequency analysis, for example, by FFT on the new data sequence formed in step ST9 and sends a beat frequency extraction result corresponding to the target to the signal processing control section 13.

In step ST3, the signal processing control section 13 receives the extraction result from the frequency extraction section 18a and makes a determination as to whether a beat frequency has been extracted. If a beat frequency has been extracted, the process advances to step ST12. If no beat frequency has been extracted, the process moves to step ST14.

In step ST12, the addition range gate setting section 25 outputs to the plural range gate data addition section 26b range gate numbers designating data to be combined by arithmetic addition, as it does in step ST10. For example, when the i-th range gate data and the (i+j)-th range gate data are added together, the plural range gate data addition section 26b performs arithmetic addition of down-phase data as expressed by {P(1), R(i)}+{P(1), R(i+j)}, {P(2), R(i)}+{P(2), R(i+j)}, . . . , {P(m), R(i)}+{P(m), R(i+j)} and, from this result, newly forms a data sequence {P(1), RR(h)}, {P(2), RR(h)}, . . . , {P(m), RR(h)}.

In step ST13, processing similar to that in step S11 is performed, that is, the frequency extraction section 18b performs frequency analysis, for example, by FFT on the new data sequence formed in step ST12 and sends a beat frequency extraction result corresponding to the target to the signal processing control section 13.

In step ST5 the signal processing control section 13 receives the extraction result from the frequency extraction section 18b and makes a determination as to whether a beat frequency has been extracted. If a beat frequency has been extracted, the process advances to step ST6. If no beat frequency has been extracted, the process moves to step ST14.

In step ST6, the relative distance and the relative speed of the target are obtained in the same manner as in the above-described well-known FMICW radar apparatus.

In step S14, the signal processing control section 13 compares the value of the counter k with H (=N/2). If k is not equal to H, the process advances to step ST8. If k is equal to H, the process moves to step ST9.

In step ST8, the signal processing control section 13 increments the value of the counter k. The process then moves to step ST10.

In step ST9, the signal processing control section 13 makes a decision on termination of the operation. If the decision is not to terminate the operation, the process returns to step ST1. If the decision is to terminate the operation, the operation is terminated. For example, the operation is terminated when an instruction from an operator is input to the signal processing control section 13.

In the conventional FMICW radar apparatus arranged as described above, there is a possibility that beat frequencies existing in different range gates and corresponding to a different target may be erroneously selected as a frequency pair to generate the distance and speed of a target which cannot exist actually, so that the reliability of measurement results is reduced.

SUMMARY OF THE INVENTION

In view of the above-described problem, an object of the present invention is to provide a radar signal processing apparatus in which signal processing of a smaller amount of data is ordinarily performed and high-load accurate signal processing is performed only on a range gate data sequence with a strong possibility of existence of a target, and which can perform real-time signal processing in this manner without reducing the reliability of measurement results.

A radar signal processing apparatus according to a first aspect of the present invention has a memory in which a beat signal sampled at predetermined time intervals is stored, a range gate for extracting a range gate data sequence from the memory, a first frequency extraction section which extracts a beat frequency corresponding to a target by performing frequency analysis by FFT at a low computation load and with low frequency measurement accuracy on all range gate data sequences extracted by the range gate, a second frequency extraction section which extracts a beat frequency corresponding to the target by performing frequency analysis by FFT at a high computation load and with high frequency measurement accuracy only on the range gate data sequence from which a beat frequency has been extracted by the first frequency extraction section, and a distance and speed derivation section which obtains a relative distance and a relative speed of the target on the basis of the beat frequency extracted by the second frequency extraction section. That is, signal processing of a smaller amount of data is ordinarily performed and high-load accurate signal processing is performed only on a range gate data sequence with a strong possibility of existence of a target, thus enabling real-time processing without reducing the reliability of measurement results.

A radar signal processing apparatus according to a fourth aspect of the present invention has a memory in which a beat signal sampled at predetermined time intervals is stored, a range gate for extracting a range gate data sequence from the memory, a range gate prediction section which predicts the relative distance of a target at the next observation time from the relative distance and the relative speed of the target derived at the current observation time, and which obtains a range gate data sequence corresponding to the predicted distance, a first frequency extraction section which extracts a beat frequency corresponding to a target by performing frequency analysis by FFT at a low computation load and with low frequency measurement accuracy on the range gate data sequence extracted by the range gate if the range gate data sequence which is the object to be processed does not coincide with the range gate data sequence predicted by the range gate prediction section, a second frequency extraction section which extracts a beat frequency corresponding to the target by performing frequency analysis by FFT at a high computation load and with high frequency measurement accuracy on the range gate data sequence extracted by the range gate if the range gate data sequence which is the object to be processed coincides with the range gate data sequence predicted by the range gate prediction section, and a distance and speed derivation section which obtains the relative distance and the relative speed of the target on the basis of the beat frequency extracted by the first or second frequency extraction section. That is, signal processing of a smaller amount of data is ordinarily performed and high-load accurate signal processing is performed only on a range gate data sequence with a strong possibility of existence of a target, thus enabling real-time processing without reducing the reliability of measurement results.

A radar signal processing apparatus according to a sixth aspect of the present invention has a memory in which a beat signal sampled at predetermined time intervals is stored, a range gate for extracting a range gate data sequence from the memory, a range gate prediction section which predicts the relative distance of a target at the next observation time from the relative distance and the relative speed of the target derived at the current observation time, and which obtains a range gate data sequence corresponding to the predicted distance, a first frequency extraction section which extracts a beat frequency corresponding to a target by performing frequency analysis by FFT at a low computation load and with low frequency measurement accuracy on all the range gate data sequences extracted by the range gate if the range gate data sequence which is the object to be processed does not coincide with the range gate data sequence predicted by the range gate prediction section, a second frequency extraction section which extracts a beat frequency corresponding to the target by performing frequency analysis by FFT at a high computation load and with high frequency measurement accuracy only on the range gate data sequence from which a beat frequency has been extracted by the first frequency extraction section if the range gate data sequence which is the object to be processed does not coincide with the range gate data sequence predicted by the range gate prediction section, and which extracts a beat frequency corresponding to the target by performing frequency analysis by FFT at a high computation load and with high frequency measurement accuracy on the range gate data sequence extracted by the range gate if the range gate data sequence which is the object to be processed coincides with the range gate data sequence predicted by the range gate prediction section, and a distance and speed derivation section which obtains the relative distance and the relative speed of the target on the basis of the beat frequency extracted by the second frequency extraction section. That is, signal processing of a smaller amount of data is ordinarily performed and high-load accurate signal processing is performed only on a range gate data sequence with a strong possibility of existence of a target, thus enabling real-time processing without reducing the reliability of measurement results.

A method of measuring a distance and a speed using FMICW according to an eighth aspect of the present invention, includes the steps of: extracting a first beat frequency corresponding to a target by performing frequency analysis by FFT at a low computation load and with low frequency measurement accuracy on all range gate data sequences extracted from a memory by a range gate; extracting a second beat frequency corresponding to the target by performing frequency analysis by FFT at a high computation load and with high frequency measurement accuracy only on the range gate data sequence from which the first beat frequency has been extracted; and obtaining the relative distance and the relative speed of the target on the basis of the second beat frequency extracted. That is, signal processing of a smaller amount of data is ordinarily performed and high-load accurate signal processing is performed only on a range gate data sequence with a strong possibility of existence of a target, thus enabling real-time processing without reducing the reliability of measurement results.

A method of measuring a distance and a speed using FMICW according to a ninth aspect of the present invention includes: the steps of predicting the relative distance of a target at the next observation time from the relative distance and the relative speed of the target derived at the current observation time to obtain a range gate data sequence corresponding to the predicted distance; extracting a first beat frequency corresponding to a target by performing frequency analysis by FFT at a low computation load and with low frequency measurement accuracy on a range gate data sequence extracted by the range gate if the range gate data sequence which is the object to be processed does not coincide with the predicted range gate data sequence; extracting a second beat frequency corresponding to the target by performing frequency analysis by FFT at a high computation load and with high frequency measurement accuracy on the range gate data sequence extracted by the range gate if the range gate data sequence which is the object to be processed coincides with the predicted range gate data sequence; and obtaining the relative distance and the relative speed of the target on the basis of the extracted first or second beat frequency. That is, processing of a smaller amount of data is ordinarily performed and high-load accurate signal processing is performed only on a range gate data sequence with a strong possibility of existence of a target, thus enabling real-time processing without reducing the reliability of measurement results.

A method of measuring a distance and a speed using FMICW according to a tenth aspect of the present invention, includes the steps of: predicting the relative distance of a target at the next observation time from the relative distance and the relative speed of the target derived at the current observation time to obtain a range gate data sequence corresponding to the predicted distance; extracting a first beat frequency corresponding to a target by performing frequency analysis by FFT at a low computation load and with low frequency measurement accuracy on all the range gate data sequences extracted by the range gate if the range gate data sequence which is the object to be processed does not coincide with the predicted range gate data sequence; extracting a second beat frequency corresponding to the target by performing frequency analysis by FFT at a high computation load and with high frequency measurement accuracy only on the range gate data sequence from which the first beat frequency has been extracted if the range gate data sequence which is the object to be processed does not coincide with the range gate data sequence predicted by the range gate prediction section, and extracting a second beat frequency corresponding to the target by performing frequency analysis by FFT at a high computation load and with high frequency measurement accuracy on the range gate data sequence extracted by the range gate if the range gate data sequence which is the object to be processed coincides with the predicted range gate data sequence; and obtaining the relative distance and the relative speed of the target on the basis of the second beat frequency extracted. That is, processing of a smaller amount of data is ordinarily performed and high-load accurate signal processing is performed only on a range gate data sequence with a strong possibility of existence of a target, thus enabling real-time processing without reducing the reliability of measurement results.

BRIEF DESCRIPTION OF THE DRAWINGS

In the accompanying drawings:

FIG. 17 is a flowchart showing the procedure of signal processing in the conventional radar signal processing apparatus shown in FIG. 16.

DESCRIPTION OF THE PREFERRED EMBODIMENTS (Embodiment 1)

Figure 1:
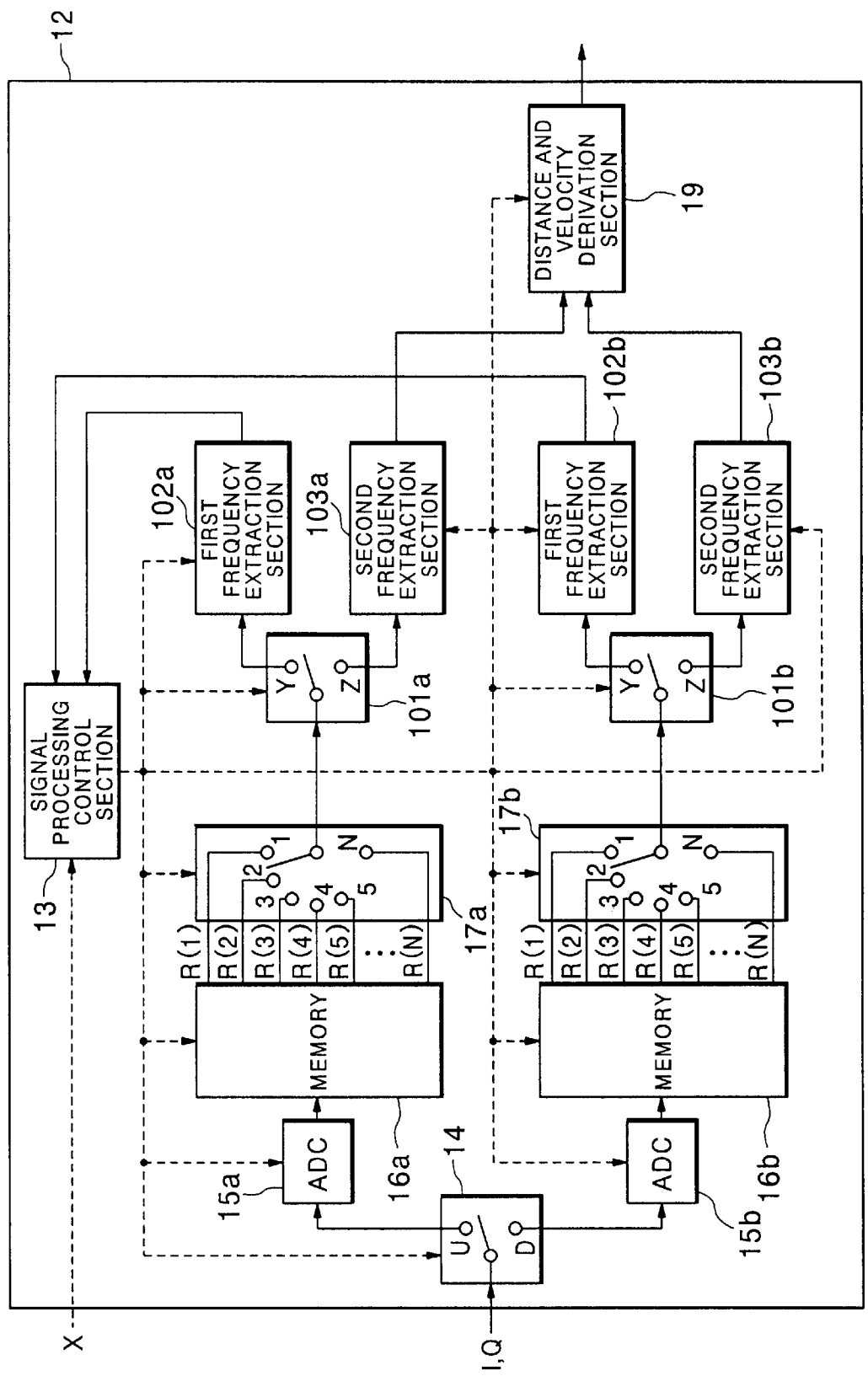
FIG. 1 is a diagram showing the structure of a radar signal processing apparatus in accordance with a first embodiment of the present invention.

A radar signal processing apparatus in accordance with a first embodiment of the present invention will be described with reference to the drawings. FIG. 1 is a diagram showing the structure of the radar signal processing apparatus of the first embodiment. In the figures, the same reference characters designate identical or corresponding components.

Figure 11:
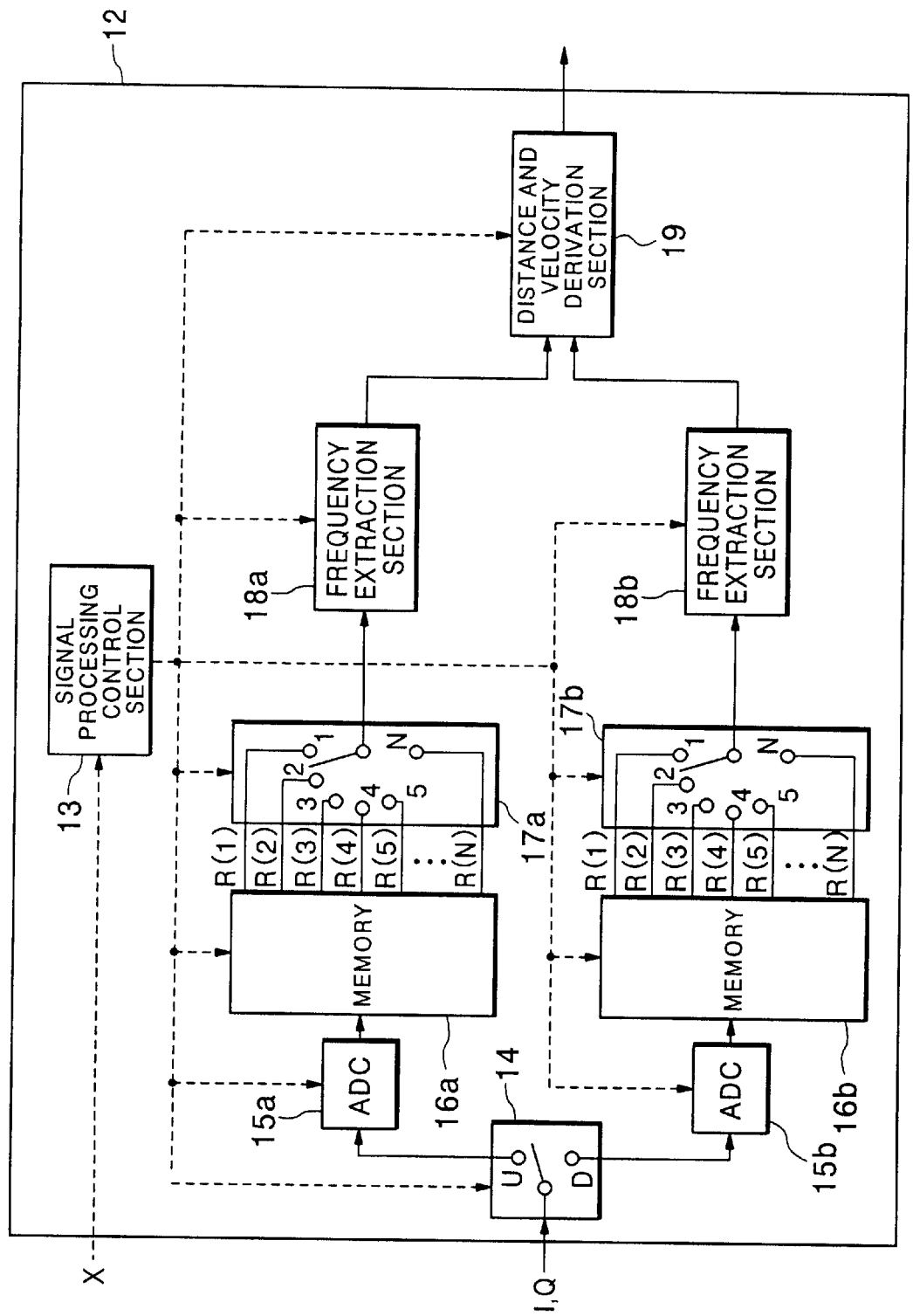
FIG. 11 is a diagram showing the structure of a conventional radar signal processing apparatus.
Figure 12:
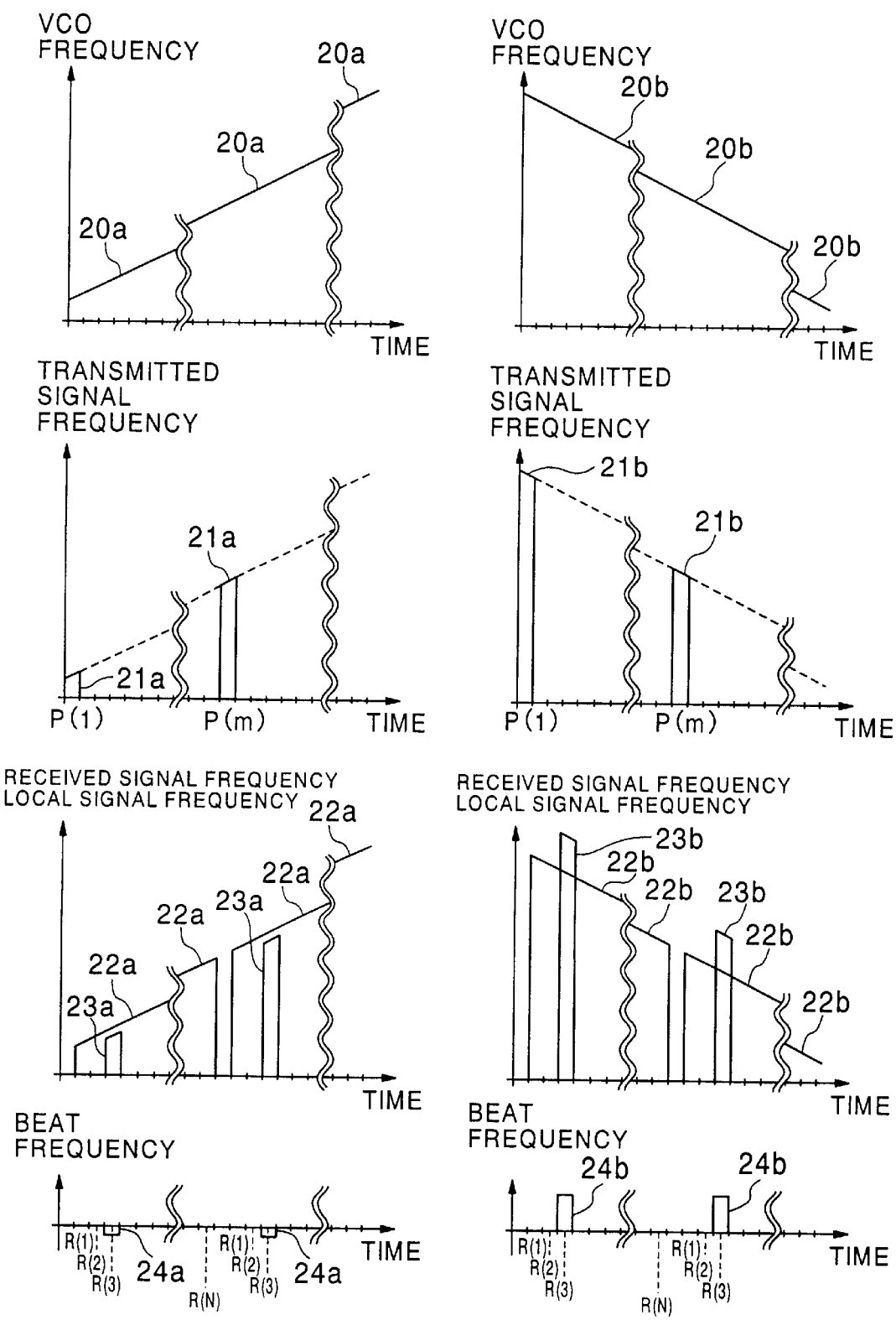
FIG. 12 is a diagram showing the frequencies of signals with respect to time in the conventional FMICW radar apparatus.
Figure 13:
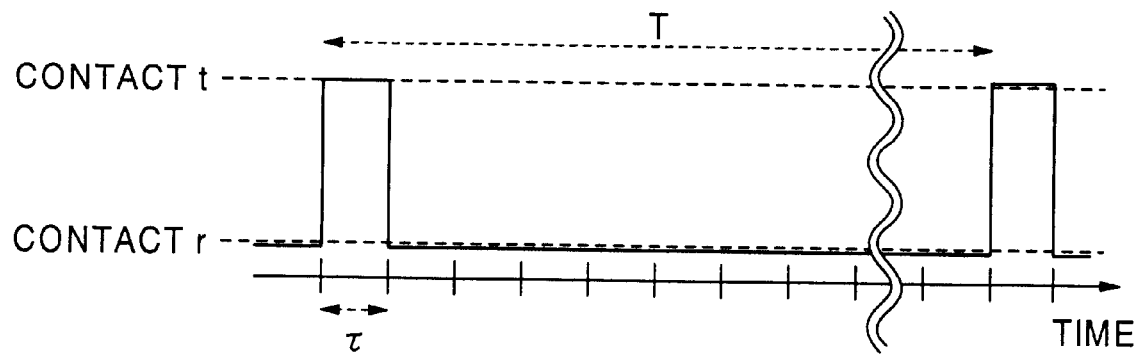
FIG. 13 is a diagram showing connection to a contact with respect to time in each of first and second switches shown in FIG. 10.

Referring to FIG. 1, fourth switches 101a and 101b, first frequency extraction sections 102a and 102b, and second frequency extraction sections 103a and 103b are provided. Other components are the same as those in the conventional radar signal processing apparatus shown in FIG. 11.

The operation of the radar signal processing apparatus of the first embodiment of the present invention will be described with reference to the accompanying drawings.

Figure 2:
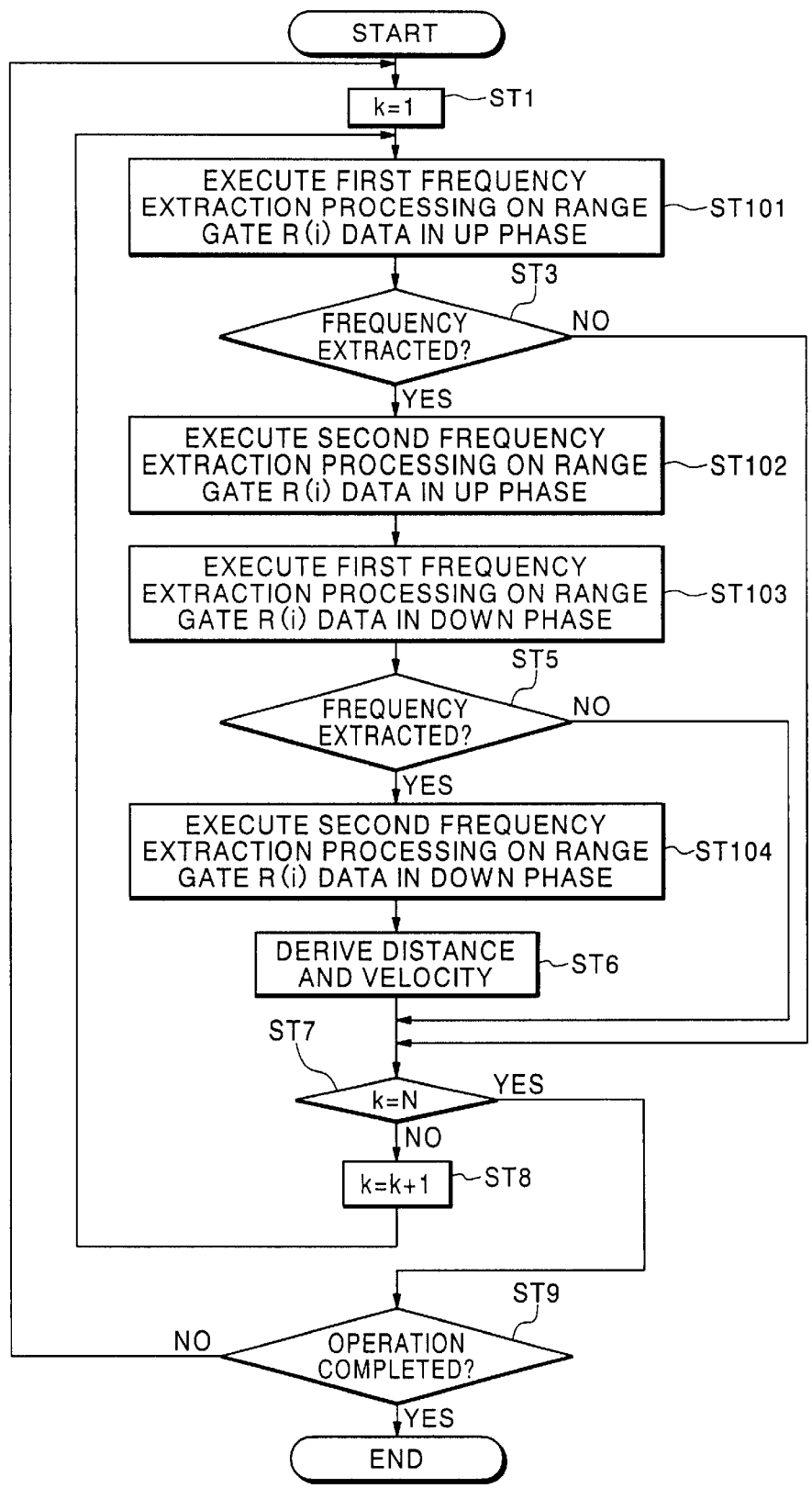
FIG. 2 is a flowchart showing the operation of the radar signal processing apparatus in accordance with the first embodiment of the invention.

FIG. 2 is a flowchart showing the operation (signal processing procedure) of the radar signal processing apparatus of the first embodiment of the present invention.

Figure 10:
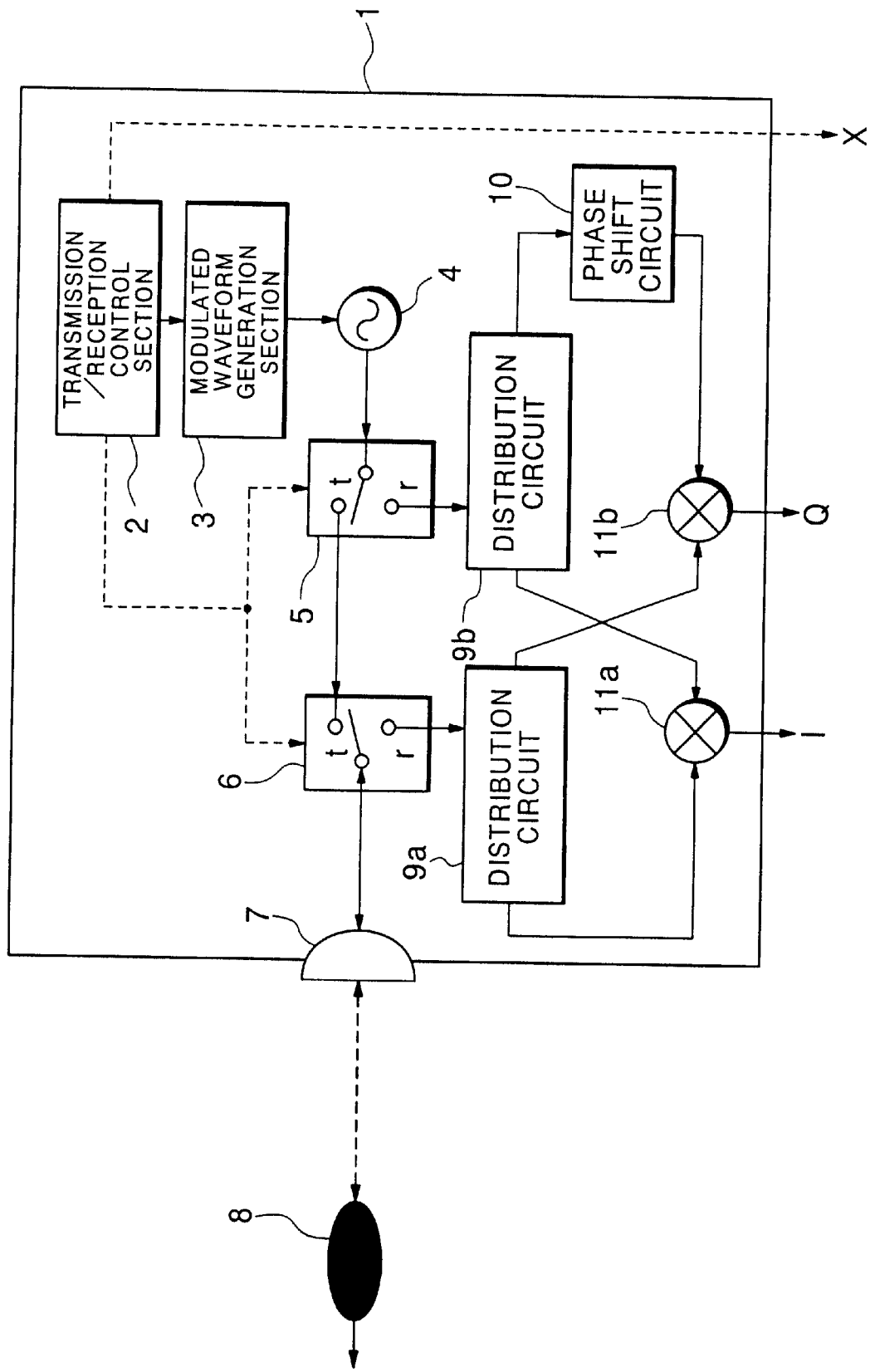
FIG. 10 is a block diagram showing the basic structure of a transmitter/receiver of a conventional FMICW radar apparatus.
Figure 14:
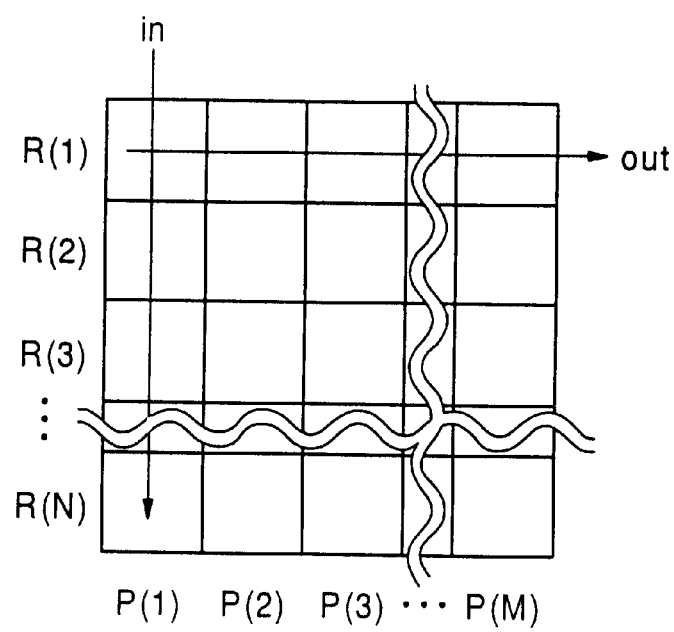
FIG. 14 is a diagram showing a data matrix formed in each of the memories shown in FIG. 11 by sampling up-phase or down-phase beat signals.
Figure 15:
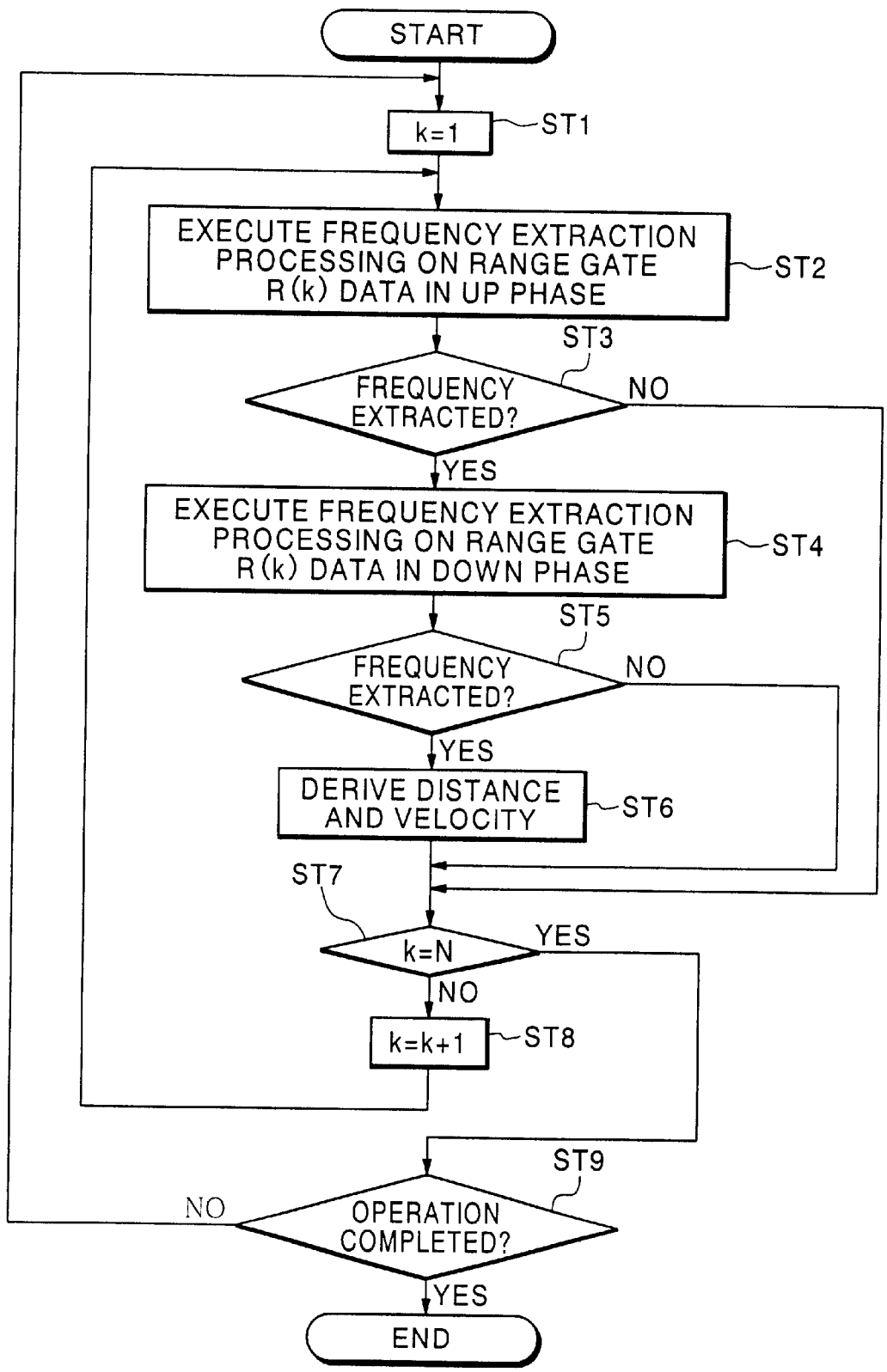
FIG. 15 is a flowchart showing the procedure of signal processing in the radar signal processing apparatus shown in FIG. 11.
Figure 16:
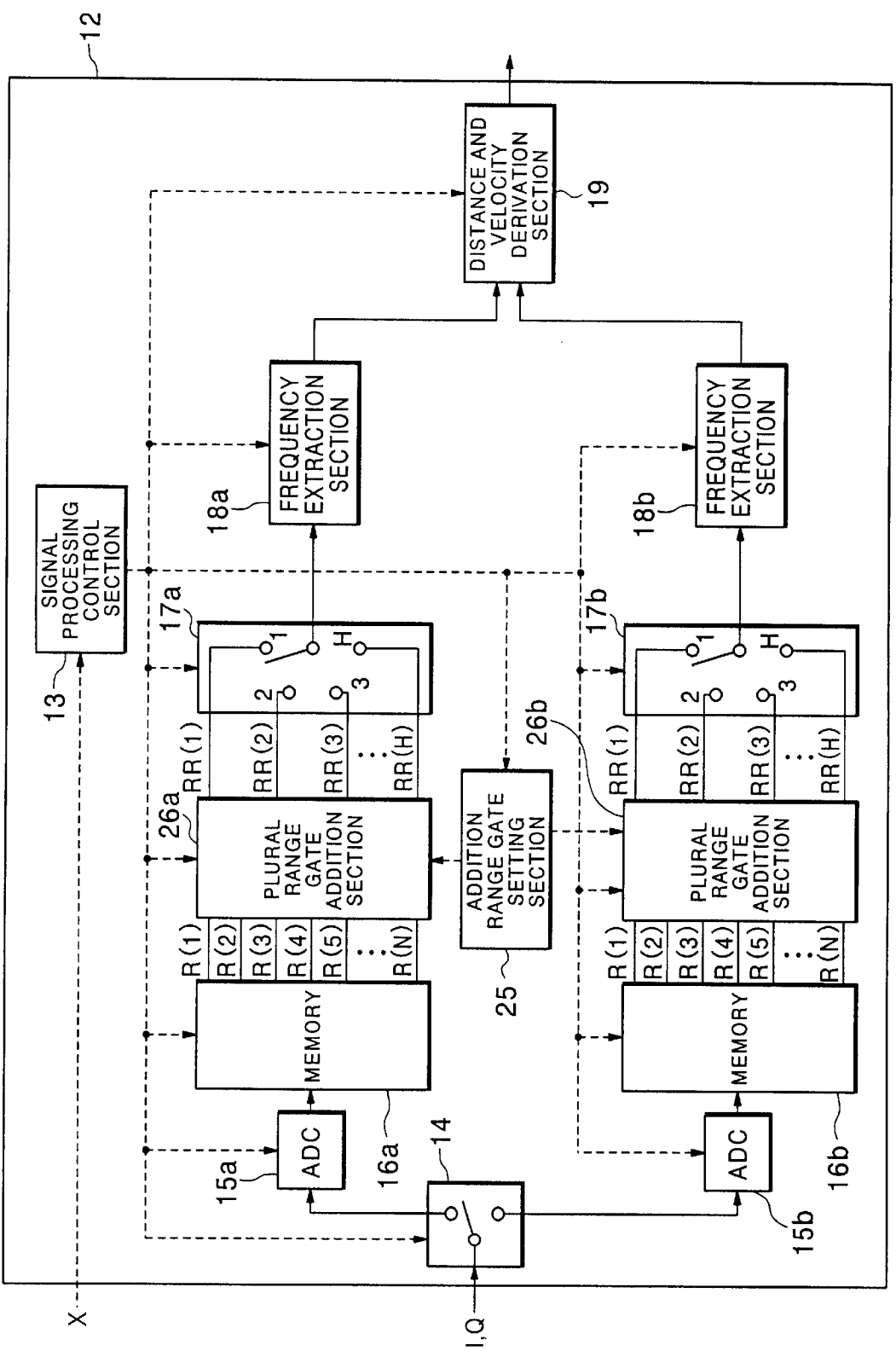
FIG. 16 shows the structure of another conventional radar signal processing apparatus.

The radar transmitter/receiver shown in FIG. 10 operates in the same manner as that in the above-described conventional example, and the signal processing control section 13, the third switch 14, the ADCs 15, and the memories 16 shown in FIG. 1 operate in the same manner as those in the above-described conventional art to form on each memory 16a data matrix as shown in FIG. 14 with respect to the corresponding phase. Signal processing is thereafter performed in accordance with the procedure shown in FIG. 2.

In step ST1 of the procedure shown in FIG. 2, the signal processing control section 13 sets a range gate number counter k provided in itself to k=1, as does the same control section in the conventional example.

In the subsequent step ST101, the signal processing control section 13 controls the range gate 17a so that connection through the k-th contact is made, and also controls the fourth switch 101a so that connection through a contact Y is made. The k-th range gate data sequence in an up phase {P(1), R(k)}, {P(2), R(k)}, . . . {P(M), R(k)} is extracted from the memory 16a through the connections in the range gate 17a and the fourth switch 101a and is input to the first frequency extraction section 102a. The first frequency extraction section 102a performs frequency analysis on this range gate data sequence by using frequency analysis means of low frequency measurement accuracy at a low computation load and sends a beat frequency extraction result corresponding to a target to the signal processing control section 13.

In step ST3, the signal processing control section 13 receives the extraction result from the first frequency extraction section 102a and makes a determination as to whether a beat frequency has been extracted. If a beat frequency has been extracted, the process advances to step ST102. If no beat frequency has been extracted, the process moves to step ST7.

In step ST102, the signal processing control section 13 controls the range gate 17a so that connection through the k-th contact is made, and also controls the fourth switch 101a so that connection through a contact Z is made. The k-th range gate data sequence in the up phase {P(1), R(k)}, {P(2), R(k)}, . . . {P(M), R(k)} is extracted from the memory 16a through the connections in the range gate 17a and the fourth switch 101a and is input to the second frequency extraction section 103a. The second frequency extraction section 103a performs frequency analysis on this range gate data sequence by using frequency analysis means of high frequency measurement accuracy at a high computation load and sends a beat frequency extraction result corresponding to the target to the distance and speed derivation section 19.

In the subsequent step ST103, the signal processing control section 13 controls the range gate 17b so that connection through the k-th contact is made, and also controls the fourth switch 101b so that connection through a contact Y is made, as it does in step ST101. The k-th range gate data sequence in a down phase {P(1), R(k)}, {P(2), R(k)}, ... {P(M), R(k)} is extracted from the memory 16b through the connections in the range gate 17b and the fourth switch 101b and is input to the first frequency extraction section 102b. The first frequency extraction section 102b performs frequency analysis on this range gate data sequence by using frequency analysis means of low frequency measurement accuracy at a low computation load and sends a beat frequency extraction result corresponding to the target to the signal processing control section 13.

In step ST5, the signal processing control section 13 receives the extraction result from the first frequency extraction section 102b and makes a determination as to whether a beat frequency has been extracted. If a beat frequency has been extracted, the process advances to step ST104. If no beat frequency has been extracted, the process moves to step ST7.

In step ST104, the signal processing control section 13 controls the range gate 17b so that connection through the k-th contact is made, and also controls the fourth switch 101b so that connection through a contact Z is made, as it does in step ST102. The k-th range gate data sequence in the down phase {P(1), R(k)}, {P(2), R(k)}, ... {P(M), R(k)} is extracted from the memory 16b through the connections in the range gate 17b and the fourth switch 101b and is input to the second frequency extraction section 103b. The second frequency extraction section 103b performs frequency analysis on this range gate data sequence by using frequency analysis means of high frequency measurement accuracy at a high computation load and sends a beat frequency extraction result corresponding to the target to the distance and speed derivation section 19.

In the subsequent step ST6, the distance and speed derivation section 19 forms all combinations of extracted beat frequencies U1, U2, ... AUp in the up phase and beat frequencies D1, D2, ... ADq in the down phase, searches for a pair of frequencies Cij (Ui, Dj) at which the relative distance R obtained by equation (6) shown below is within the range Rk expressed by equation (5). If a pair of frequencies which meet the condition is found, the relative speed V of the target is obtained by using equation (7).

In the subsequent steps ST7, ST8, and ST9, the signal processing control section 13 operates in the same manner as in the conventional example.

Figure 3:
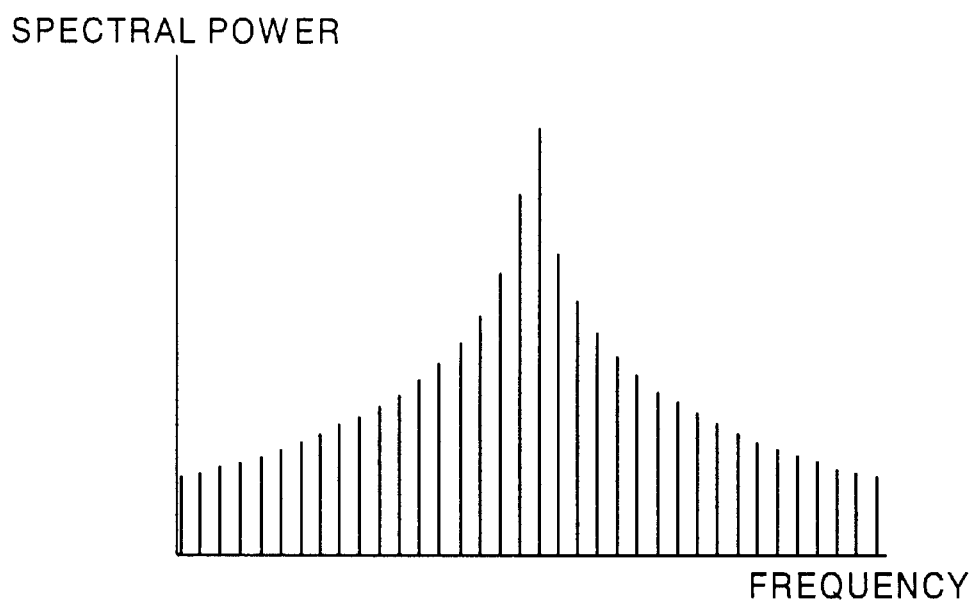
FIG. 3 is a diagram showing the spectrum of discrete frequencies extracted by a second frequency extraction section in the radar signal processing apparatus in accordance with the first embodiment of the invention.
Figure 4:
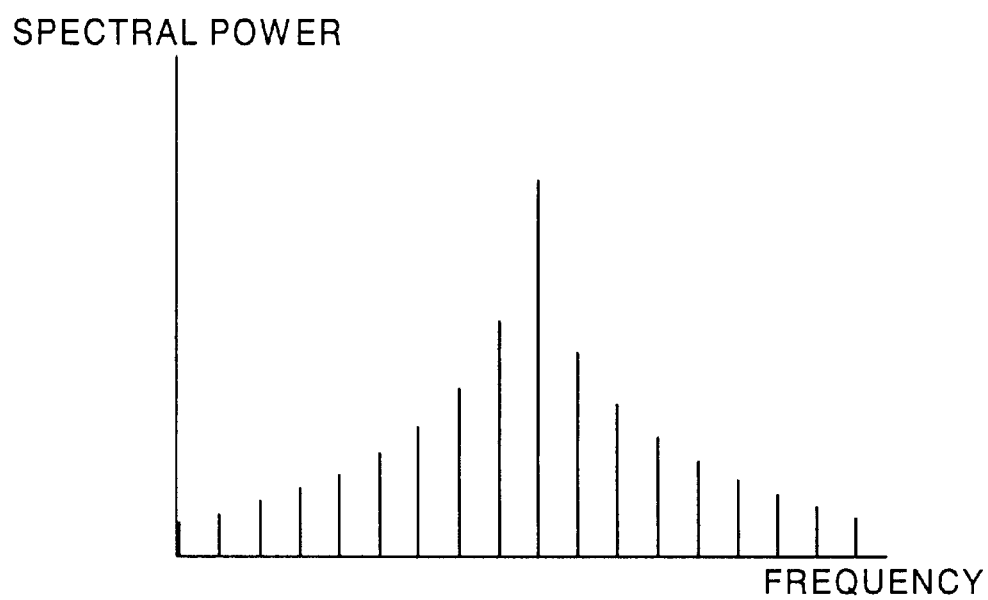
FIG. 4 is a diagram showing the spectrum of discrete frequencies extracted by a first frequency extraction section in the radar signal processing apparatus in accordance with the first embodiment of the invention.

While the spectrum of discrete frequencies extracted by the second frequency extraction section 103 is as shown in FIG. 3, the spectrum of discrete frequencies extracted by the first frequency extraction section 102 may have an increased discrete frequency interval as the spectrum shown in FIG. 4 and, in such a case, the frequency measurement accuracy is reduced. For example, such frequency extraction results can be obtained in such a manner that, if the number of data items sampled through one range gate is assumed to be M, M/2-point FFT using only half of the sampled data is used as the frequency analysis means having low frequency measurement accuracy and operated at a low computation load in the first frequency extraction section 102, while M-point FFT using all the sampled data is used as the frequency analysis means having high frequency measurement accuracy and operated at a high computation load in the second frequency extraction section 103.

The amount of computation necessary for frequency analysis in this case according to the conventional art is expressed by $$N \times (M\text{-point } FFT)$$

According to the present invention, if the number of targets is Nt, the necessary amount of computation is expressed by $$N \times (M/2\text{-point } FFT) + Nt \times (M\text{-point } FFT)$$

If $(M\text{-point } FFT) > 2 \times (M/2\text{-point } FFT)$, $$N/2 \times (M\text{-point } FFT) > N \times (M/2\text{-point } FFT)$$

From this inequality, $$(N/2 + Nt) \times (M\text{-point } FFT) > N \times (M/2\text{-point } FFT) + Nt \times (M\text{-point } FFT)$$

is obtained.

Further, if N/2>Nt, $$N \times (M\text{-point } FFT) > (N/2 + Nt) \times (M\text{-point } FFT) > N \times (M/2\text{-point } FFT) \times (M\text{-point } FET)$$

Thus, the amount of computation in the present invention is always smaller.

For example, the number of multiplications may be assumed to represent the amount of computation in M-point FFT. The number of multiplications is expressed by $$(M/2)\log 2(M)$$

and satisfies a relational equation:

$$(M\text{-point } FFT) > 2 \times (M/2\text{-point } FFT)$$

If Nmax which satisfies N/2>Nmax is set to the maximum number of processible targets, $$N/2 > Nt = N\text{max}$$

can be realized. Thus, the present invention reduces the amount of computation in comparison with the conventional art and improves the facility with which real-time processing is realized.

Figure 5:
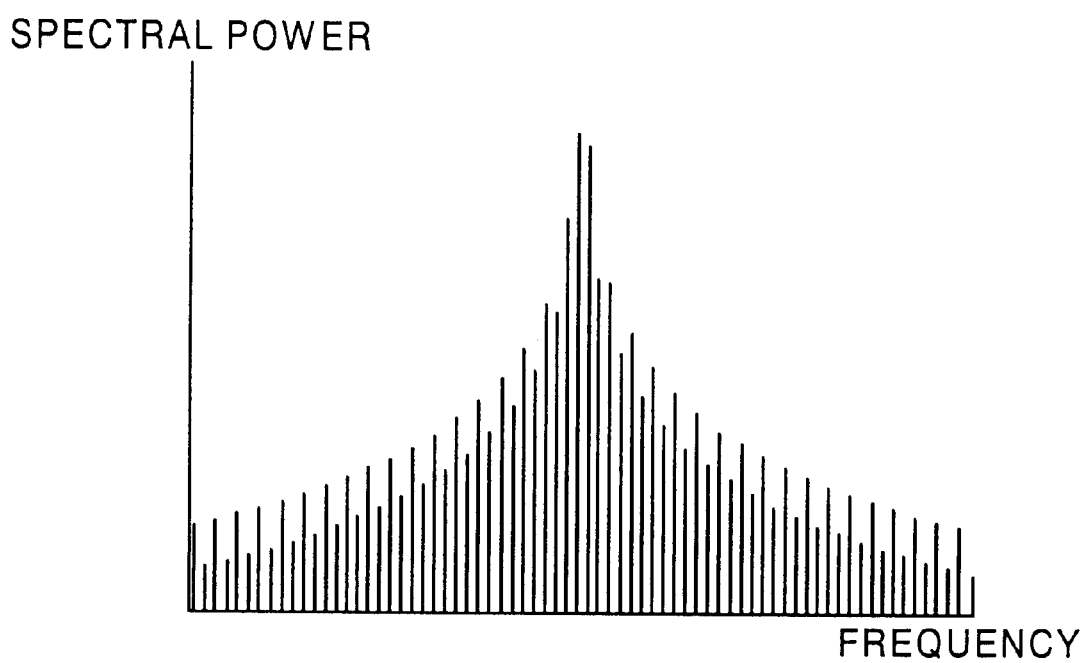
FIG. 5 is a diagram showing a discrete frequency spectrum which is a result of 2M-point FFT in the radar signal processing apparatus in accordance with the first embodiment of the invention.

The frequency analysis means may alternatively be such that, if the number of data items sampled through one range gate is assumed to be M, M-point FFT using all the sampled data is used as the frequency analysis means having low frequency measurement accuracy and operated at a low computation load in the first frequency extraction section 102, and 2M-point FFT using data obtained by adding M number of 0s (zeros) to the sampled data is used as the frequency analysis means having high frequency measurement accuracy and operated at a high computation load in the second frequency extraction section 103. In this case, if the result of the M-point FFT is as shown in FIG. 3, the result of the 2M-point FFT is as shown in FIG. 5 and frequencies can be obtained at smaller discretion intervals. If, for example, peak search in the frequency extraction result shown in FIG. 5 is performed, the resulting accuracy is higher than that based on the result shown in FIG. 3.

In this case, while the amount of computation necessary for frequency analysis according to the conventional art is $$N \times (M\text{-point } FFT),$$

the necessary amount of computation according to the present invention is $$N \times (M\text{-point } FFT) + Nt \times (2M\text{-point } FFT).$$

If (2M-point FFT)>2×(M-point FFT) and N/2>Nt, the frequency accuracy is two times higher than that in the conventional art while the amount of computation is smaller than the value two times larger than the amount of computation in the conventional art.

(Embodiment 2)

Figure 6:
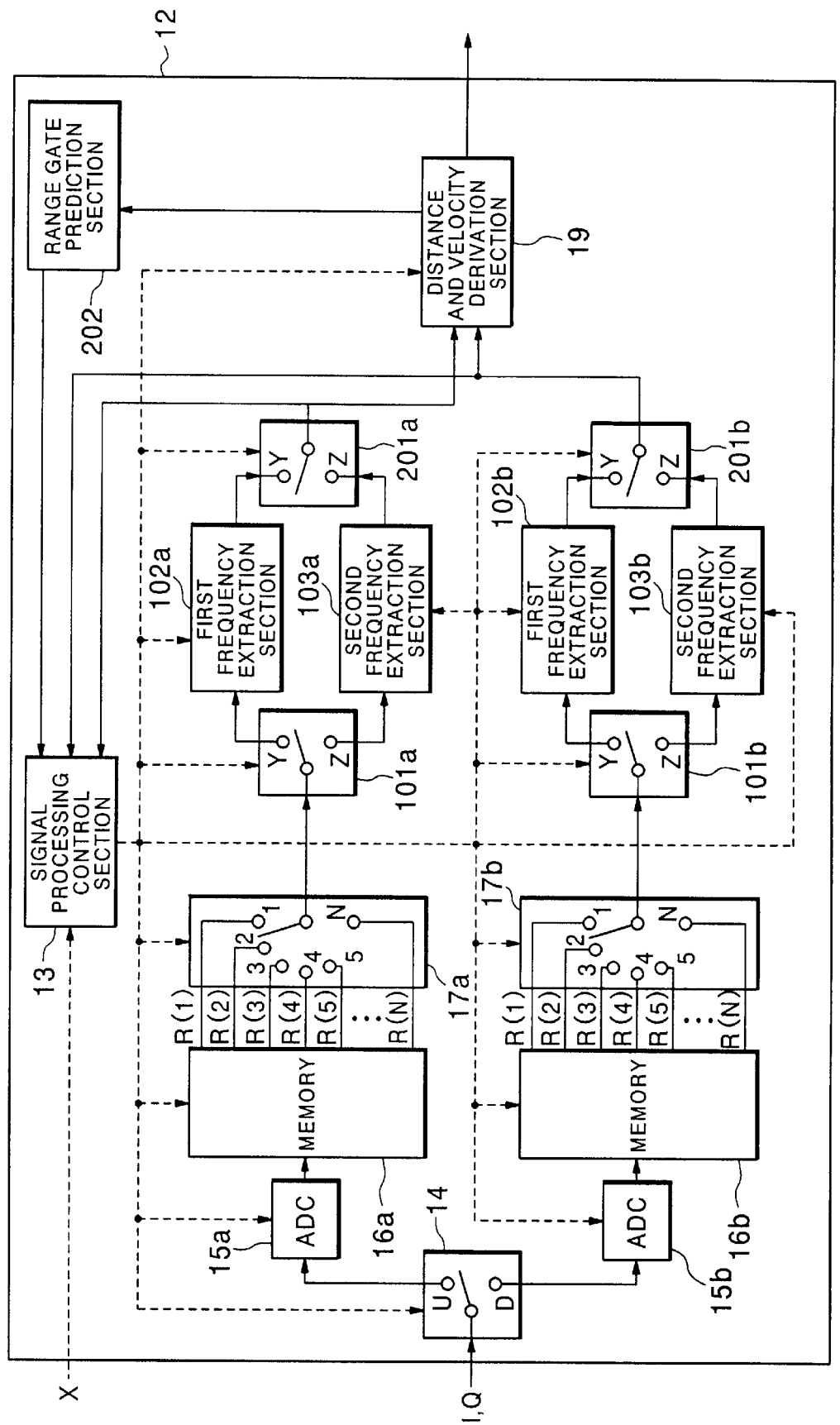
FIG. 6 is a diagram showing the structure of a radar signal processing apparatus in accordance with a second embodiment of the present invention.

A radar signal processing apparatus in accordance with a second embodiment of the present invention will be described with reference to the drawings. FIG. 6 is a diagram showing the structure of the radar signal processing apparatus of the second embodiment of the present invention.

Referring to FIG. 6, fifth switches 201a and 201b, and a range gate prediction section 202 are provided. Other components are the same as those of the first embodiment shown in FIG. 1.

The operation of the radar signal processing apparatus of the second embodiment will be described with reference to the accompanying drawings.

Figure 7:
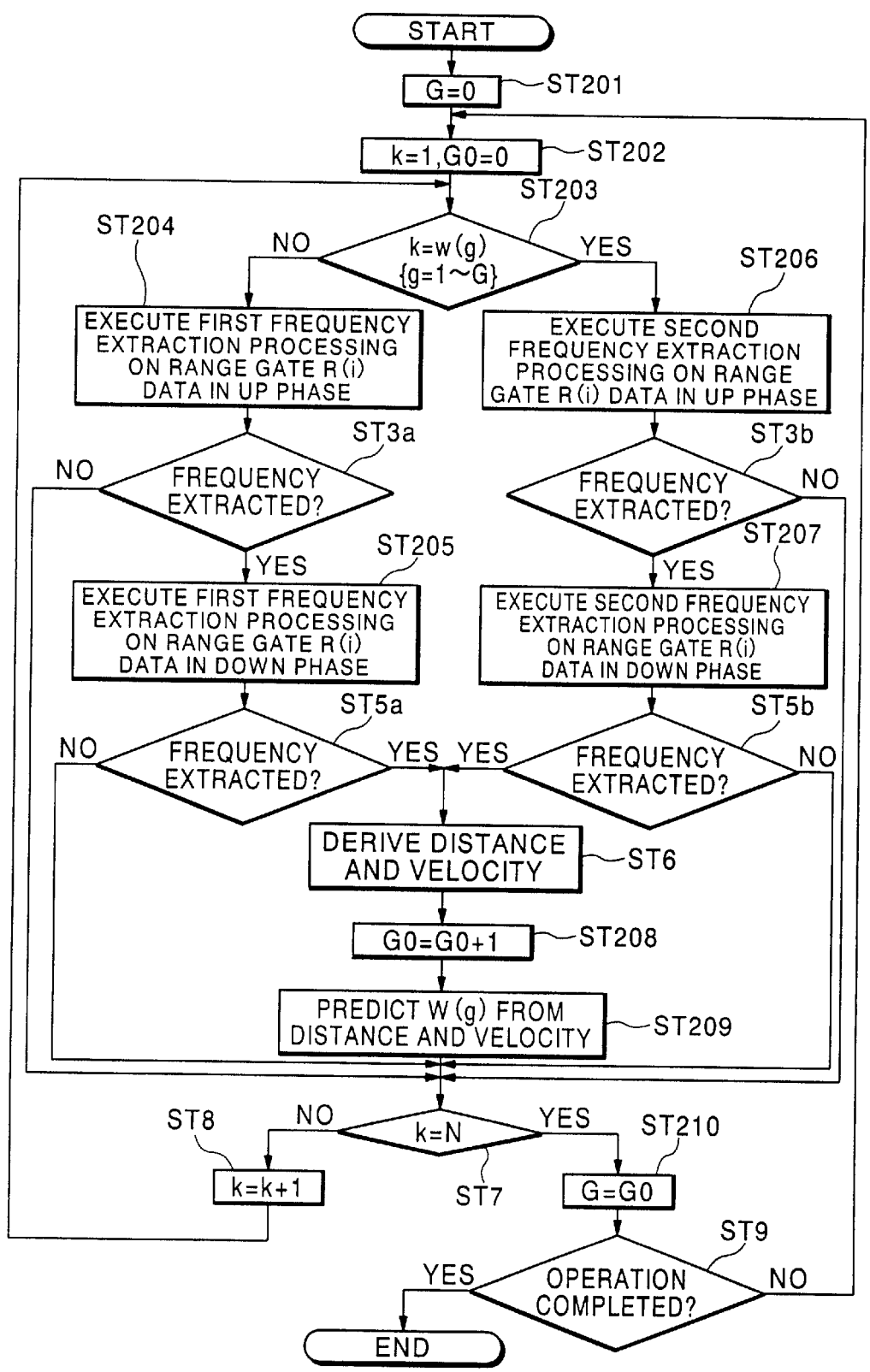
FIG. 7 is a flowchart showing the operation of the radar signal processing apparatus in accordance with the second embodiment of the invention.

FIG. 7 is a flowchart showing the operation (signal processing procedure) of the radar signal processing apparatus of the second embodiment of the present invention.

The radar transmitter/receiver shown in FIG. 10 operates in the same manner as that in the above-described conventional example, and the signal processing control section 13, the third switch 14, the ADCs 15, and the memories 16 shown in FIG. 6 operate in the same manner as those in the above-described conventional example to form on each memory 16a data matrix as shown in FIG. 14 with respect to the corresponding phase. Signal processing is thereafter performed in accordance with the procedure shown in FIG. 7.

In step ST201 of the procedure shown in FIG. 7, the signal processing control section 13 sets a past-number-of-targets counter G provided in itself to G=0.

In step ST202, the signal processing control section 13 sets a current-number-of-targets counter G provided in itself to G=0 and sets the range gate number counter k to k=1.

In the subsequent step ST203, the signal processing control section 13 makes a determination as to whether the range gate number k of the object to be currently processed is equal to one of G number of values of w(g) {g=1 to G). If there is no equal in w(g), the process advances to step ST204. If there is an equal in w(g), the process moves to step ST206.

In step ST204, the signal processing control section 13 controls the range gate 17a so that connection through the k-th contact is made, and also controls the fourth switch 101a so that connection through the contact Y is made. The k-th range gate data sequence in an up phase {P(1), R(k)}, {P(2), R(k)}, ... {P(M), R(k)} is extracted from the memory 16a through the connections in the range gate 17a and the fourth switch 101a and is input to the first frequency extraction section 102a. The first frequency extraction section 102a performs frequency analysis on this range gate data sequence by using frequency analysis means of low frequency measurement accuracy at a low computation load, obtains a beat frequency extraction result corresponding to a target, and sends the frequency extraction result with respect to the up-phase beat signal to the signal processing control section 13 via the fifth switch 201a in which connection through a contact Y is made under the control of the signal processing control section 13.

In the subsequent step ST3a, the signal processing control section 13 receives the extraction result from the first frequency extraction section 102a and makes a determination as to whether an up-phase beat frequency has been extracted. If an up-phase beat frequency has been extracted, the process advances to step ST205. If no up-phase beat frequency has been extracted, the process moves to step ST7.

In step ST205, the signal processing control section 13 controls the range gate 17b so that connection through the k-th contact is made, and also controls the fourth switch 101b so that connection through the contact Y is made. The k-th range gate data sequence in a down phase {P(1), R(k)}, {P(2), R(k)}, ... {P(M), R(k)} is extracted from the memory 16b through the connections in the range gate 17b and the fourth switch 101b and is input to the first frequency extraction section 102b. The first frequency extraction section 102b performs frequency analysis on this range gate data sequence by using frequency analysis means of low frequency measurement accuracy at a low computation load, obtains a beat frequency extraction result corresponding to the target, and sends the frequency extraction result with respect to the down-phase beat signal to the signal processing control section 13 via the fifth switch 201b in which connection through a contact Y is made under the control of the signal processing control section 13.

In step ST5a, the signal processing control section 13 receives the extraction result from the first frequency extraction section 102b and makes a determination as to whether a down-phase beat frequency has been extracted. If a down-phase beat frequency has been extracted, the process advances to step ST6. If no down-phase beat frequency has been extracted, the process moves to step ST7.

In step ST206 to which the process moves in the case where it is determined that there is an equal in w(g) at step ST203, the signal processing control section 13 controls the range gate 17a so that connection through the k-th contact is made, and also controls the fourth switch 101a so that connection through the contact Z is made. The k-th range gate data sequence in the up phase {P(1), R(k)}, {P(2), R(k)}, ... {P(M), R(k)} is extracted from the memory 16a through the connections in the range gate 17a and the fourth switch 101a and is input to the second frequency extraction section 103a. The second frequency extraction section 103a performs frequency analysis on this range gate data sequence by using frequency analysis means of high frequency measurement accuracy at a high computation load, obtains a beat frequency extraction result corresponding to a target, and sends the frequency extraction result with respect to the up-phase beat signal to the signal processing control section 13 via the fifth switch 201a in which connection through a contact Z is made under the control of the signal processing control section 13.

In the subsequent step ST3b, the signal processing control section 13 receives the extraction result from the second frequency extraction section 103a and makes a determination as to whether an up-phase beat frequency has been extracted. If an up-phase beat frequency has been extracted, the process advances to step ST207. If no up-phase beat frequency has been extracted, the process moves to step ST7.

In step ST207, the signal processing control section 13 controls the range gate 17b so that connection through the k-th contact is made, and also controls the fourth switch 101b so that connection through the contact Z is made. The k-th range gate data sequence in a down phase {P(1), R(k)}, {P(2), R(k)}, ... {P(M), R(k)} is extracted from the memory 16b through the connections in the range gate 17b and the fourth switch 101b and is input to the second frequency extraction section 103b. The second frequency extraction section 103b performs frequency analysis on this range gate data sequence by using frequency analysis means of high frequency measurement accuracy at a high computation load, obtains a beat frequency extraction result corresponding to the target, and sends the frequency extraction result with respect to the down-phase beat signal to the signal processing control section 13 via the fifth switch 201b in which connection through a contact Z is made under the control of the signal processing control section 13.

In step ST5b, the signal processing control section 13 receives the extraction result from the second frequency extraction section 103b and makes a determination as to whether a down-phase beat frequency has been extracted. If a down-phase beat frequency has been extracted, the process advances to step ST6. If no down-phase beat frequency has been extracted, the process moves to step ST7.

In step ST6, the distance and speed derivation section 19 obtains the relative distance and the relative speed of the target in the same manner as that in the conventional example.

In step ST208, the signal processing control section 13 increments the value of the counter G0.

In step ST209, the range gate prediction section 202 receives input about the relative distance and the relative speed of the target obtained by the distance and speed derivation section 19 in step ST6, predicts the relative distance to the target at the time of the next observation, obtains the range gate number w corresponding to the predicted distance, and output the range gate number w to the signal processing control section 13. For example, on the assumption that the target is moving in uniform rectilinear motion, w is obtained by the following equation:

$$w=(R+\Delta T \times v)/(c\tau)$$

The signal processing control section 13 stores the input range gate number in w(G0).

In step ST7, the signal processing control section 13 compares the value of the counter k with N. If k is not equal to N, the process advances to step ST8. If k is equal to N, the process moves to step ST210.

In step ST8, the signal processing control section 13 increments the value of the counter k. The process then moves to step ST203.

In step ST210, the value of the counter G0 is stored in the counter G to set the current-number-of-targets as a past-number-of-targets.

In step ST9, the signal processing control section 13 makes a decision on termination of the operation. If the decision is not to terminate the operation, the process returns to step ST202. If the decision is to terminate the operation, the operation is terminated.

For example, in a case where, if the number of data items sampled through one range gate is assumed to be M, M/2-point FFT using only half of the sampled data is used as the frequency analysis means having low frequency measurement accuracy and operated at a low computation load in the first frequency extraction section 102, and where M-point FFT using all the sampled data is used as the frequency analysis means having high frequency measurement accuracy and operated at a high computation load in the second frequency extraction section 103, the amount of computation necessary for frequency analysis in the second and other subsequent observations is $$(N-Nt) \times (M/2\text{-point } FFT) + Nt \times (M\text{-point } FFT).$$

Thus, the amount of computation is further reduced.

(Embodiment 3)

Figure 8:
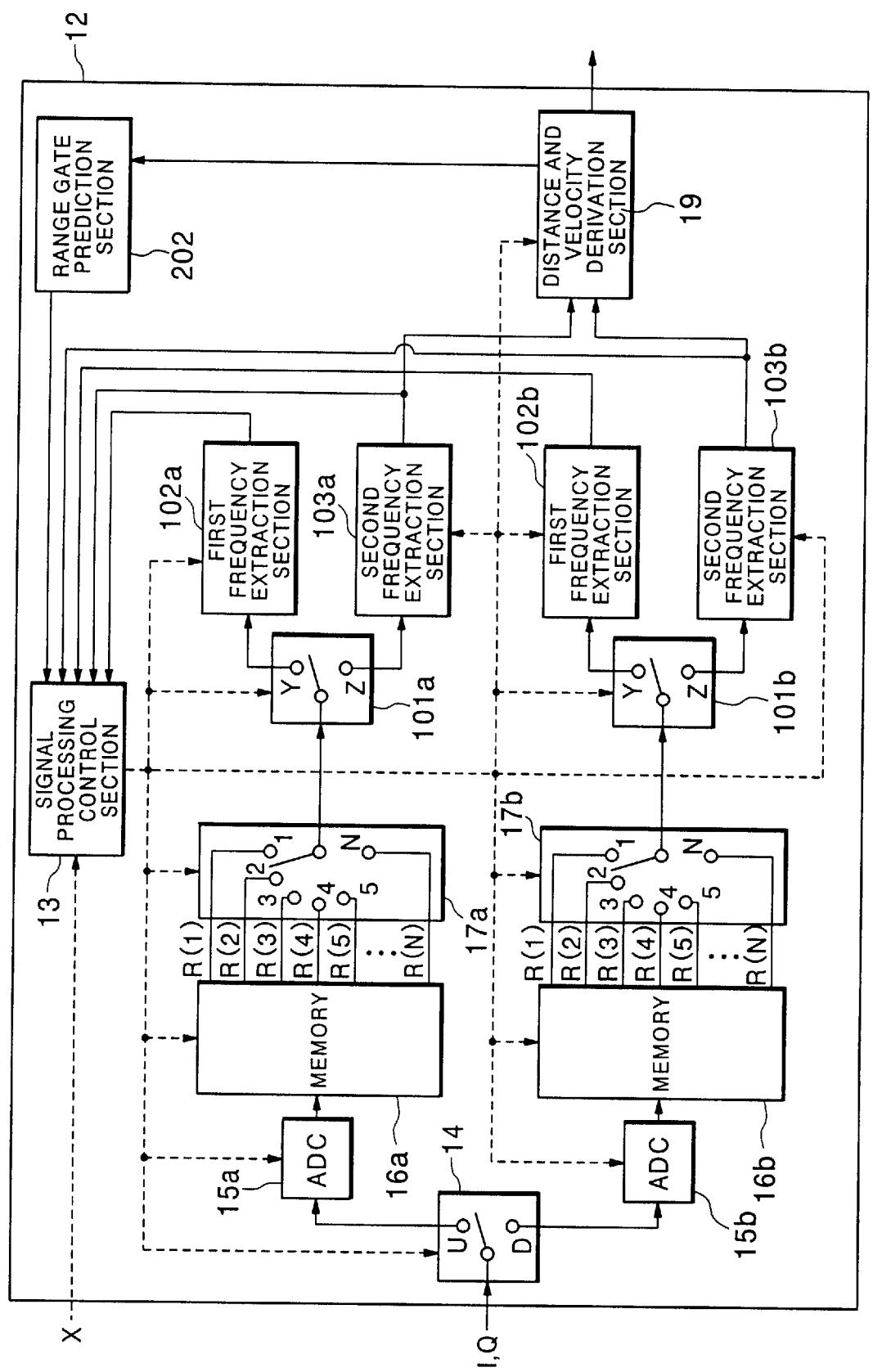
FIG. 8 is a diagram showing the structure of a radar signal processing apparatus in accordance with a third embodiment of the present invention.

A radar signal processing apparatus in accordance with a third embodiment of the present invention will be described with reference to the drawings. FIG. 8 is a diagram showing the structure of the radar signal processing apparatus of the third embodiment of the present invention.

Referring to FIG. 8, the components of the third embodiment are the same as those of the embodiment 2 shown in FIG. 6 except that the fifth switches 201a and 201b are not provided.

The operation of the radar signal processing apparatus of the third embodiment will be described with reference to the accompanying drawings.

Figure 9:
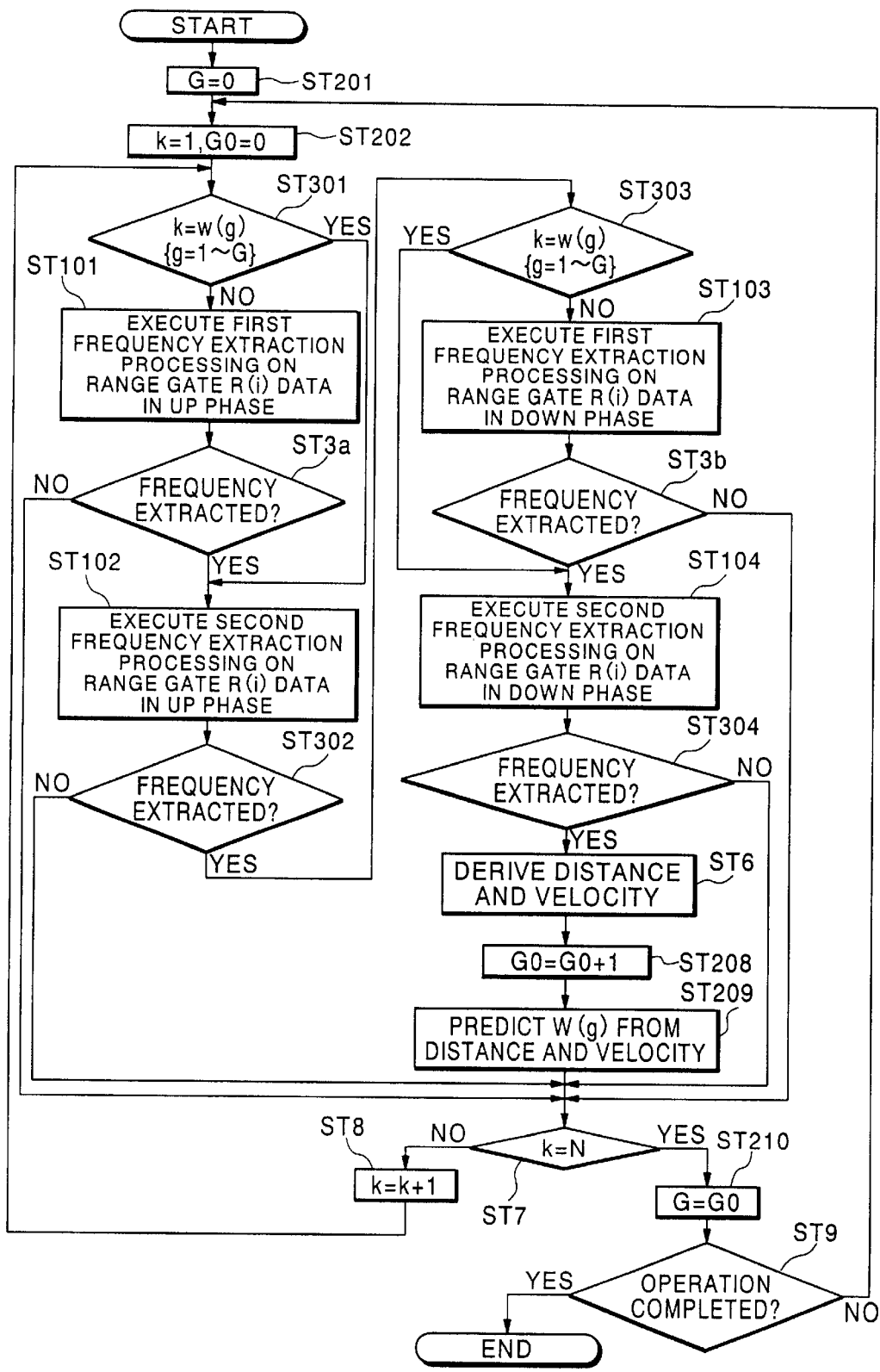
FIG. 9 is a flowchart showing the operation of the radar signal processing apparatus in accordance with the third embodiment of the invention.

FIG. 9 is a flowchart showing the operation (signal processing procedure) of the radar signal processing apparatus of the third embodiment of the present invention.

The radar transmitter/receiver shown in FIG. 10 operates in the same manner as that in the above-described conventional example, and the signal processing control section 13, the third switch 14, the ADCs 15, and the memories 16 shown in FIG. 8 operate in the same manner as those in the above-described conventional example to form on each memory 16a data matrix as shown in FIG. 14 with respect to the corresponding phase. Signal processing is thereafter performed in accordance with the procedure shown in FIG. 9.

In the first step ST301 of the procedure shown in FIG. 9, the signal processing control section 13 makes a determination as to whether the range gate number k of the object to be currently processed is equal to one of G number of values of w(g) {g=1 to G}. If there is no equal in w(g), the process advances to step ST101. If there is an equal in w(g), the process moves to step ST102.

In step ST302, the signal processing control section 13 receives the extraction result from the second frequency extraction section 103a and makes a determination as to whether an up-phase beat frequency has been extracted. If an up-phase beat frequency has been extracted, the process advances to step ST303. If no up-phase beat frequency has been extracted, the process moves to step ST7.

In step ST303, the signal processing control section 13 makes a determination as to whether the range gate number k of the object to be currently processed is equal to one of the G number of values of w(g) {g=1 to G}. If there is no equal in w(g), the process advances to step ST103. If there is an equal in w(g), the process moves to step ST104.

In step ST304, the signal processing control section 13 receives the extraction result from the second frequency extraction section 103b and makes a determination as to whether a down-phase beat frequency has been extracted. If a down-phase beat frequency has been extracted, the process advances to step ST6. If no down-phase beat frequency has been extracted, the process moves to step ST7.

In other respects, the process in this embodiment is the same as that in the first or second embodiment. In this embodiment, a measurement result can be obtained with high accuracy even with respect to a target first detected.

What is claimed is:

1. A radar signal processing apparatus comprising:
   a memory in which a beat signal sampled at predetermined time intervals is stored;
   a range gate for extracting a range gate data sequence from the memory;
   a first frequency extraction section which extracts a beat frequency corresponding to a target by performing frequency analysis by FFT at a low computation load and with low frequency measurement accuracy on all range gate data sequences extracted by the range gate;

a second frequency extraction section which extracts a beat frequency corresponding to the target by performing frequency analysis by FFT at a high computation load and with high frequency measurement accuracy only on the range gate data sequence from which a beat frequency has been extracted by the first frequency extraction section; and a distance and speed derivation section which obtains a relative distance and a relative speed of the target on the basis of the beat frequency extracted by the second frequency extraction section.

2. A radar signal processing apparatus according to claim 1, wherein the first frequency extraction section uses M/2-point FFT using only half of M sampled data items, and the second frequency extraction section uses M-point FFT using all the M sampled data items.

3. A radar signal processing apparatus according to claim 1, wherein the first frequency extraction section uses M-point FFT using all of M sampled data items, and the second frequency extraction section uses 2M-point FFT using data obtained by adding M number of 0s (zeros) to the M sampled data items.

4. A radar signal processing apparatus comprising:

a memory in which a beat signal sampled at predetermined time intervals is stored;

a range gate for extracting a range gate data sequence from the memory;

a range gate prediction section which predicts the relative distance of a target at the next observation from the relative distance and the relative speed of the target derived at the current observation time, and which obtains a range gate data sequence corresponding to the predicted distance;

a first frequency extraction section which extracts a beat frequency corresponding to a target by performing frequency analysis by FFT at a low computation load and with low frequency measurement accuracy on the range gate data sequence extracted by the range gate if the range gate data sequence which is the object to be processed does not coincide with the range gate data sequence predicted by the range gate prediction section;

a second frequency extraction section which extracts a beat frequency corresponding to the target by performing frequency analysis by FFT at a high computation load and with high frequency measurement accuracy on the range gate data sequence extracted by the range gate if the range gate data sequence which is the object to be processed coincides with the range gate data sequence predicted by the range gate prediction section; and a distance and speed derivation section which obtains the relative distance and the relative speed of the target on the basis of the beat frequency extracted by the first or second frequency extraction section.

5. A radar signal processing apparatus according to claim 4, wherein the first frequency extraction section uses M/2-point FFT using only half of M sampled data items, and the second frequency extraction section uses M-point FFT using all the M sampled data items.

6. A radar signal processing apparatus comprising:

a memory in which a beat signal sampled at predetermined time intervals is stored;

a range gate for extracting a range gate data sequence from the memory;

a range gate prediction section which predicts the relative distance of a target at the next observation from the relative distance and the relative speed of the target derived at the current observation time, and which obtains a range gate data sequence corresponding to the predicted distance;

a first frequency extraction section which extracts a beat frequency corresponding to a target by performing frequency analysis by FFT at a low computation load and with low frequency measurement accuracy on all the range gate data sequences extracted by the range gate if the range gate data sequence which is the object to be processed does not coincide with the range gate data sequence predicted by the range gate prediction section;

a second frequency extraction section which extracts a beat frequency corresponding to the target by performing frequency analysis by FFT at a high computation load and with high frequency measurement accuracy only on the range gate data sequence from which a beat frequency has been extracted by the first frequency extraction section if the range gate data sequence which is the object to be processed does not coincide with the range gate data sequence predicted by the range gate prediction section, and which extracts a beat frequency corresponding to the target by performing frequency analysis by FFT at a high computation load and with high frequency measurement accuracy on the range gate data sequence extracted by the range gate if the range gate data sequence which is the object to be processed coincides with the range gate data sequence predicted by the range gate prediction section; and a distance and speed derivation section which obtains the relative distance and the relative speed of the target on the basis of the beat frequency extracted by the second frequency extraction section.

7. A radar signal processing apparatus according to claim 6, wherein the first frequency extraction section uses M/2-point FFT using only half of M sampled data items, and the second frequency extraction section uses M-point FFT using all the M sampled data items.

8. A method of measuring a distance and a speed using FMICW, comprising the steps of:

extracting a first beat frequency corresponding to a target by performing frequency analysis by FFT at a low computation load and with low frequency measurement accuracy on all range gate data sequences extracted from a memory by a range gate;

extracting a second beat frequency corresponding to the target by performing frequency analysis by FFT at a high computation load and with high frequency measurement accuracy only on the range gate data sequence from which the first beat frequency has been extracted; and obtaining the relative distance and the relative speed of the target on the basis of the second beat frequency extracted.

9. A method of measuring a distance and a speed using FMICW, comprising the steps of:

predicting the relative distance of a target from the relative distance and the relative speed of the target derived at the current observation time to obtain a range gate data sequence corresponding to the predicted distance;

extracting a first beat frequency corresponding to a target by performing frequency analysis by FFT at a low computation load and with low frequency measurement accuracy on a range gate data sequence extracted by a range gate if the range gate data sequence which is the object to be processed does not coincide with the predicted range gate data sequence;

extracting a second beat frequency corresponding to the target by performing frequency analysis by FFT at a high computation load and with high frequency measurement accuracy on the range gate data sequence extracted by the range gate if the range gate data sequence which is the object to be processed coincides with the predicted range gate data sequence; and obtaining the relative distance and the relative speed of the target on the basis of the first or second beat frequency.

10. A method of measuring a distance and a speed using FMICW, comprising the steps of:

predicting the relative distance of a target from the relative distance and the relative speed of the target derived at the current observation time to obtain a range gate data sequence corresponding to the predicted distance;

extracting a first beat frequency corresponding to a target by performing frequency analysis by FFT at a low computation load and with low frequency measurement accuracy on a range gate data sequence extracted by a range gate if the range gate data sequence which is the object to be processed does not coincide with the predicted range gate data sequence;

extracting a second beat frequency corresponding to the target by performing frequency analysis by FFT at a high computation load and with high frequency measurement accuracy only on the range gate data sequence from which the first beat frequency has been extracted if the range gate data sequence which is the object to be processed does not coincide with the predicted range gate data sequence, and extracting a beat frequency corresponding to the target by performing frequency analysis by FFT at a high computation load and with high frequency measurement accuracy on the range gate data sequence extracted by the range gate if the range gate data sequence which is the object to be processed coincides with the predicted range gate data sequence; and obtaining the relative distance and the relative speed of the target on the basis of the second beat frequency extracted.

* * * * *